United States Patent [19]

Dijkstra et al.

[11] Patent Number: 4,691,134
[45] Date of Patent: Sep. 1, 1987

[54] ELECTRIC MACHINE WITH IMPROVED COIL CONNECTION

[75] Inventors: Arend Dijkstra; Bernardus Haijkens; Mient Veenstra, all of Drachten, Netherlands

[73] Assignee: U.S. Philips Corporation, New York, N.Y.

[21] Appl. No.: 856,918

[22] Filed: Apr. 28, 1986

[30] Foreign Application Priority Data

May 3, 1985 [NL] Netherlands ......................... 8501258

[51] Int. Cl.$^4$ ........................................... H02K 13/00
[52] U.S. Cl. .................................................. 310/234
[58] Field of Search .................. 310/234, 233, 235–237

[56] References Cited

U.S. PATENT DOCUMENTS 2,844,749  7/1958  Shetterly ............................. 310/234
4,349,384  9/1982  Weinert ........................... 310/234 X Primary Examiner—Donovan F. Duggan
Attorney, Agent, or Firm—F. Brice Faller

[57] ABSTRACT

Electric machine has at least one coil with ends of the coil wire fixed to separate connection elements. The connection elements are provided with a relatively thick soft-solder layer of at least approximately 30μ thickness. The soldered connection between an end of a coil wire and a connection element can be made by means of a laser.

3 Claims, 4 Drawing Figures

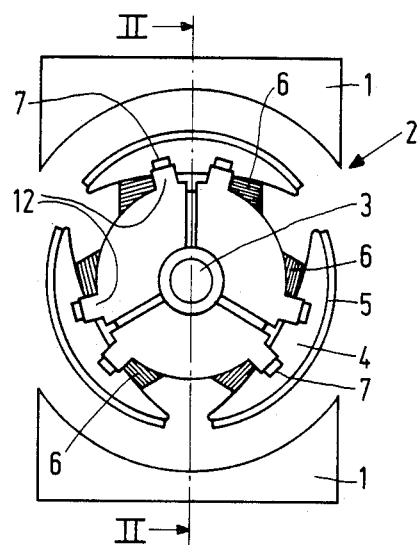
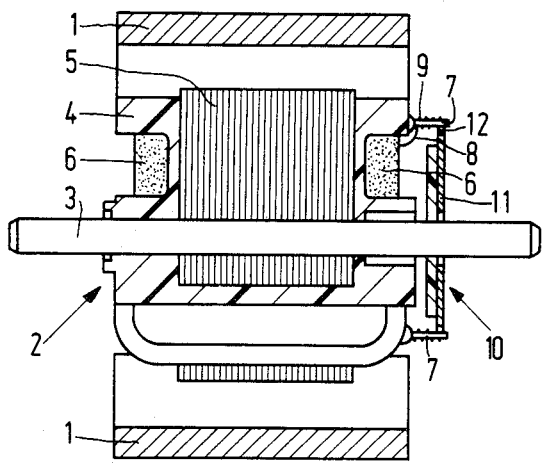
FIG.1  FIG.2
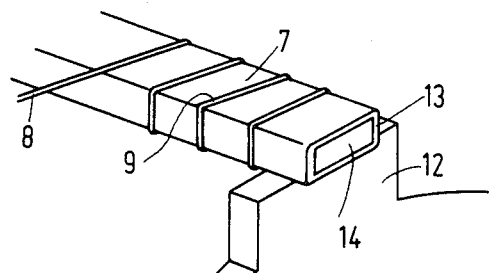
FIG.3
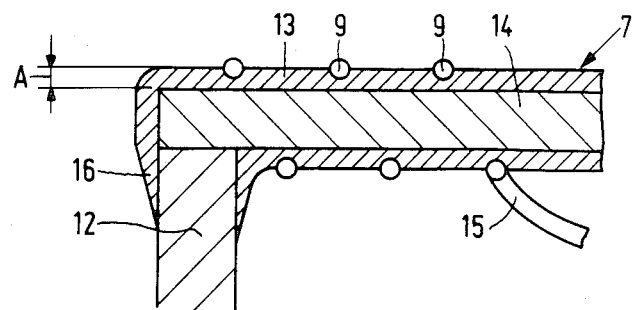
FIG.4

ELECTRIC MACHINE WITH IMPROVED COIL CONNECTION

BACKGROUND OF THE INVENTION

The invention relates to an electric machine with at least one coil, where the ends of the coil wire are fixed to separate connection elements.

An electric machine of this kind is known for example from DE-PA 26 13 194. The connection elements that serve for the electrical connection of the coil with other components of the machine often have a larger cross-section and are made of a material having greater strength than the coil wire, which is thin relative to the connection elements. Because of this, the fixing of the ends of the coil wire to the connection elements can give rise to problems, which is disadvantageous for example in automation of the process.

The object of the invention is to provide a solution to these problems and is characterized by connection elements provided with a soft-solder layer at least approximately 30μ thick.

BRIEF DESCRIPTION OF THE DRAWING

FIG. 1 shows a plan view of an electric motor.
FIG. 2 shows a cross-section through the line II—II in FIG. 1.
FIG. 3 shows a perspective drawing of a part of the embodiment in FIGS. 1 and 2.
FIG. 4 shows an enlarged cross-section of a soldered connection.

DESCRIPTION OF THE PREFERRED EMBODIMENT

FIGS. 1 and 2 show schematically an electric motor with a stator 1 and a rotor 2. Mounted on the shaft 3 of the rotor 2 is an insulating member 4 with a lamination core 5 and coils 6. The insulation member 4 is provided with axially directed connection elements 7 to which the ends 9 of the coil wire 8 are fixed. Likewise mounted on the shaft 3 is a collector 10 with contact elements 11, which contact elements are provided with lugs 12 that are in connection with the connection elements 7.

FIGS. 3 and 4 give in detail and on a larger scale than in FIGS. 1 and 2 the connection of the ends 9 of the coil wire 8 with the connection elements 7 and the lugs 12. The connection element 7 is implemented as a metal strip of rectangular cross-section, which is a simple shape to manufacture and possesses a good plane surface for the lug 12.

Since the connection element 7 has to link up with other parts of the electric machine, as for example the lug 12 of the collector 10 and is required to be resistant to mechanical loads. A connection element 7 will often be made of a material having a greater strength and a substantially larger cross-section than coil wire 8. The mechanical load may be very considerable, in particular when the connection elements 7 are mounted on a rotor and are subject during operation the machine to centrifugal forces. The fixing together of two parts possessing different strengths and different dimensions, such as the coil wire 8 and a connection element 7, can in general cause problems. In particular if the parts are fixed together by soldering or welding, there is a considerable risk of a bad joint or of wire fracture owing among other things to the great difference in the heat capacity of the parts.

It has been found that a practical solution to these problems is to provide the connection element with a soft-solder layer of at least approximately 30μ thick. This soft-solder layer 13, preferably of a lead-tin compound, surrounds like a sleeve the metal core 14 of rectangular cross-section, made for example of phosphor bronze. The usual thickness of a soft-solder layer for a soldered joint lies in the region of 5-10μ. Due to the relatively large thickness A (FIG. 4) of the soft-solder layer, being at least approximately 30μ, the edges of the connection element 7 are rounded. This prevents damage to the end 9 of a coil wire 8 through contact with a sharp edge of the connection element 7 when a few turns of wire are wound around the connection element.

During the soldering of the end 9 to the connection element 7 the windings of the end will sag into the soft-solder layer. The part 15 of the coil wire between a coil 6 and a connection element 7, which was originally tightly tensioned, will consequently loose its tension and possibly even hang somewhat loose. This avoids the risk of this part of the wire being under too great tension, which could give rise to wire fracture.

The fact that the windings of the end 9 at least partly sag into the thick soft-solder layer guarantees good electrical and thermal conductivity between the end 9 and the soft-solder layer 13. In this way, too, better protection is provided against mechanical damage.

The fixing of the end 9 of the coil wire 8 to a connection element 7 and of the connection element to the lug 12 of the collector 10 can be performed in a single soldering operation whereby a 16 of the soft-solder layer 13 flows out over the lug 12.

The construction in accordance with the invention lends itself particularly well to a soldering process using a laser, since in this way an accurately directed and dosed quantity of heat can be supplied to the parts to be connected.

It has been found that even wire of very small diameter, for example 25μ, can be fixed without problems to a connection element as described above. Electric machines with widely different supply voltages for the coils and in which there are therefore considerable differences in the diameters of the coil wire, can now all be provided with the same connection elements, thereby cutting production costs.

The embodiment described in the foregoing is eminently suitable for an automated manufacturing process in which the winding of the coil, the winding of the ends of the coil wire around the connection elements and the soldering can be completely carried out by machines. Since no exaggerated requirements need be imposed on the accuracy with which the turns of the end of the coil wire should be wound around the connection elements, the connections can be made in a single soldering process and the percentage of rejects is small.

What is claimed is:

1. Electric machine comprising at least one coil of wire wound about an insulating member and at least two discrete connection elements fixed between said insulating member and collector means of said machine, each connection element comprising a metal core provided with a layer of soft solder, each end of said wire of each coil being embedded in the solder of a respective connection element, each element being soldered to said collector means.

2. Electric machine as in claim 1 wherein said layer of soft solder is at least 30μ thick.

3. Electric machine as in claim 1 wherein each said metal core has a rectangular cross section.

* * * * *